INVENTORS:
HARRELL W. PADEN
HULLET C. CARR
ALFRED W. McDOWELL
BY
Carl C. Batz
ATT'Y

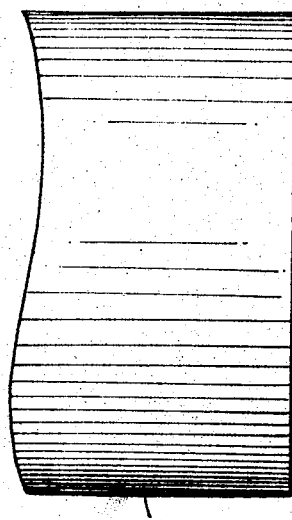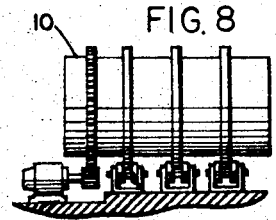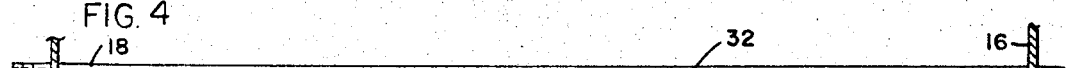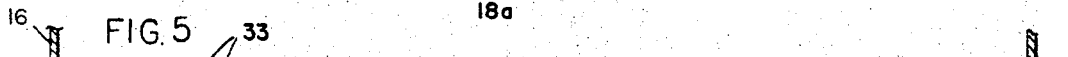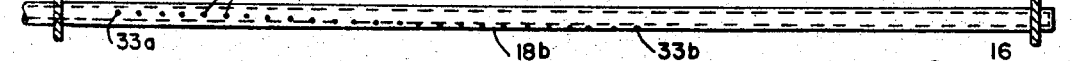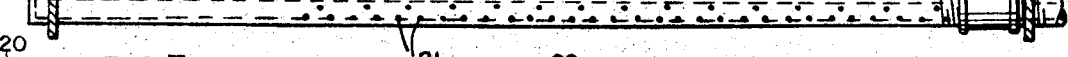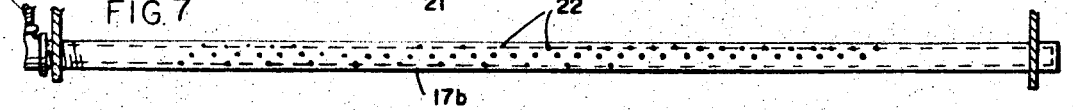

United States Patent Office 3,449,106
Patented June 10, 1969

3,449,106
PROCESS AND APPARATUS FOR PREPARING GRANULAR FERTILIZER FROM ORGANIC MATERIALS
Harrell W. Paden, Leland, and Hullet C. Carr and Alfred W. McDowell, Wilmington, N.C., assignors, by mesne assignments, to USS Agri-Chemicals, Inc., Pittsburgh, Pa., a corporation of Delaware
Filed Aug. 9, 1965, Ser. No. 478,361
Int. Cl. C05f 13/00, 7/00; C05c 3/00
U.S. Cl. 71—13                          9 Claims

ABSTRACT OF THE DISCLOSURE

A method of granulating fertilizer materials in which the materials are separated into heavy and fine particles and the fine particles are preferentially wet during the granulating process.

---

This invention relates to the production of granular fertilizer, and more particularly to a method and apparatus for preparing strong, abrasion-resistant fertilizer granules from fertilizer mixtures containing substantial amounts of fibrous organic matter.

Tobacco fertilizers and similar fertilizers have been prepared from sources containing large amounts of fibrous material and consist of non-granular or semi-granular materials. The large amount of organic materials required, such as sewage sludge, process tankage, and/or cottonseed meal, have retarded or resisted normal granulation methods. Even if granulation does occur to some extent, the granules formed are weak and soft and do not retain their granular characteristics if subjected to rough handling treatment.

We have discovered that spherical, tough, and abrasion-resistant granules can be formed from such sources containing large quantities of fibrous organic matter through the use of process and apparatus means and without the addition of special binders, or the like. By employing a unique design of spargers in combination with a steam-water mixture, with the sparged sulfuric acid and nitrogen solution uniquely placed within the moving mass of granulating materials, strong abrasion-resistant granules are formed in exceptionally high yields.

A primary object, therefore, of our invention is to provide a process and apparatus for effectively granulating fertilizer mixtures containing large quantities of fibrous organic matter. A further object is to provide a process in which the spherical strong granules are produced by a unique application of sulfuric acid and nitrogen solution to the moving mass in the granulating procedure. A still further object is to provide apparatus in which spargers introduce acid, nitrogen solution, and water in an effective manner for bringing about granulation. Other specific objects and advantages will appear as the specification proceeds.

Figure 1:
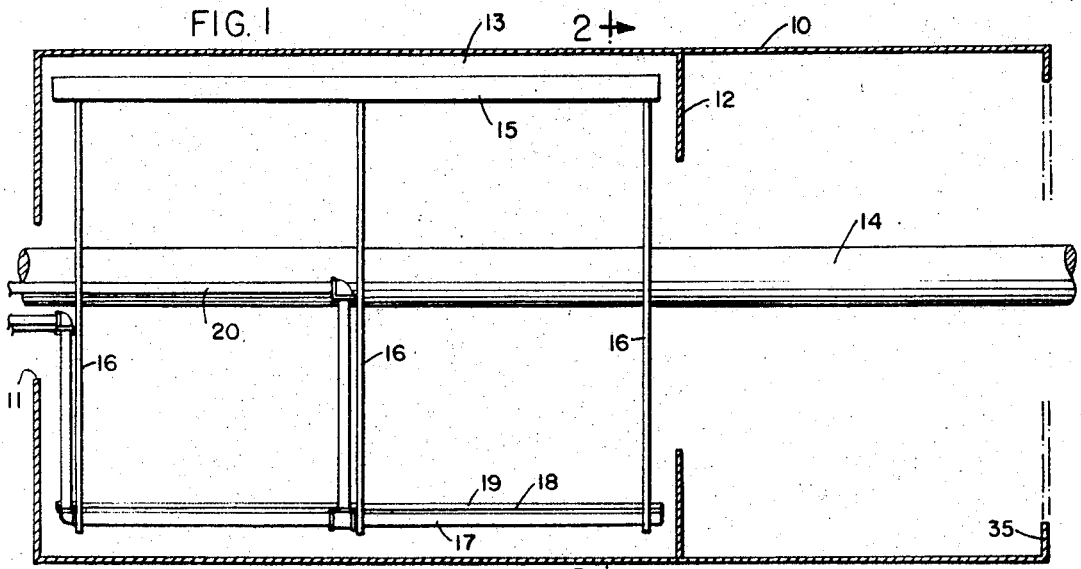
Figure 2:
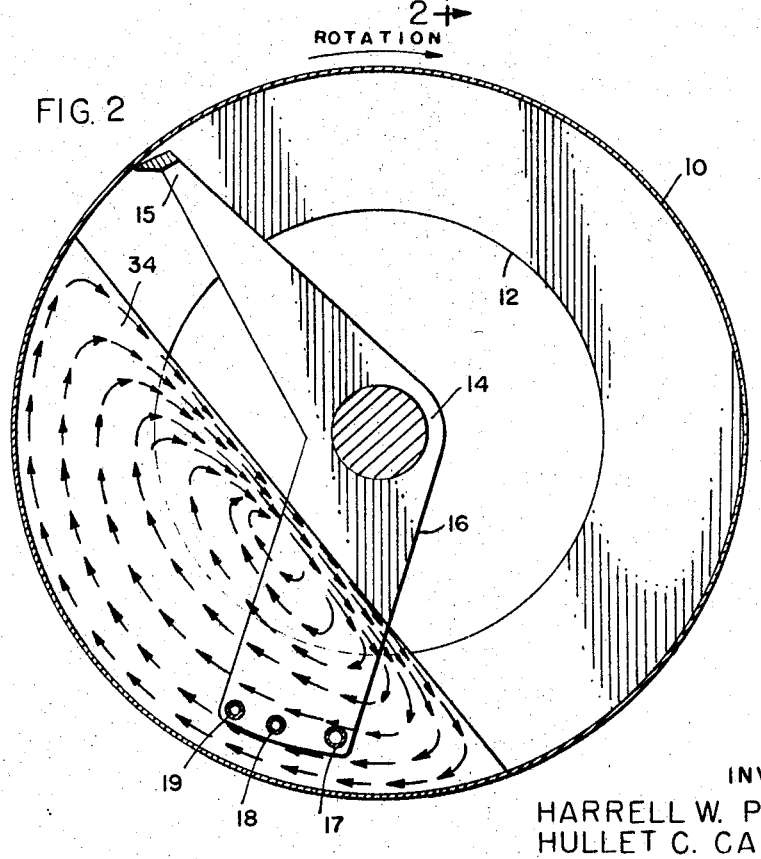

The invention is shown, in an illustrative embodiment, by the accompanying drawings, in which:

FIGURE 1 is a longitudinal view, partly in section, of apparatus with which our invention may be employed; FIG. 2, a transverse sectional view, the section being taken as indicated at line 2–2 of FIG. 1; FIG. 3, a broken, enlarged detail view of apparatus which may be employed for supplying a steam-water mixture to the granulator; FIG. 4, a bottom plan view of the upstream portion of the spargers used for nitrogen solution and sulfuric acid; FIG. 5, a bottom plan view similar to FIG. 4, showing the downstream portion of the spargers; FIG. 6, a bottom plan view of the upstream portion of the sparger for supplying a steam-water mixture; FIG. 7, a bottom plan view of the downstream portion of the sparger for supplying the steam-water mixture; and FIG. 8, a side view, on a reduced scale, of typical power means which may be employed for rotating the drum on supporting rollers.

In the illustration given, 10 designates a cylindrical drum which is supported for rotating about its longitudinal axis. It will be understood that the usual roller supports and motor-driven gear mechanism of the type shown in FIG. 8 may be employed for rotating the drum. The drum has a centrally apertured front end 11 through which the dry fertilizer ingredients may be introduced into the drum, and spaced inwardly from the apertured front end 11 is an annular dam or weir 12 which provides, with the forward end 11, a granulating chamber 13. Extending through the drum is a stationary support member 14 which carries a fixed scraper 15 and depending sparger supports 16. The sparger supports 16 are apertured near their lower ends to receive a steam and water pipe or sparger 17, a nitrogen solution sparger 18, and a sulfuric acid sparger 19. The steam-water mixture may be prepared in any suitable manner and is preferably supplied through the pipe 20 to the central portion of the steam-water sparger 17, as shown more clearly in FIG. 1. The upstream portion 17a of the steam-water pipe 17 is provided at its bottom with discharge openings 21, as shown more clearly in FIG. 6. The downstream portion 17b of the steam-water sparger 17 is provided at its bottom with openings 22, as shown more clearly in FIG. 7.

Any suitable means or methods for preparing the steam-water mixture may be employed. In the illustration given in FIG. 3, steam is introduced under pressure through inlet pipe 23 controlled by a pressure regulator 24 and a steam flow meter d./p. cell 25. A manual steam control is shown at 26. Supply water also under pressure is introduced through water inlet 27, passing about a water rotometer 28 and a water control valve 29. A steam-water mixer is provided at 30, and the temperature of the mixture is indicated on the instrument 31.

The sparger 18 and the sparger 19 are preferably the same in structure and will be described together as sparger 18. The upstream portion of the sparger 18 and which is indicated as 18a is provided along its bottom with discharge openings 32. The downstream portion of sparger 18, which is indicated in FIG. 5 as 18b, is provided with a spiral arrangement of discharge openings 33. By "upstream" portion is meant the portion of the sparger nearest the inlet end 11 of the drum. By "downstream" portion of the sparger is meant the portion extending between the center sparger support and the annular dam or weir 12.

The spiral arrangement of the discharge openings 33 in the downstream portion of spargers 18 and 19 is important for preventing the rewetting of product size granules approaching the discharge openings of the dam or weir 12. Each succeeding sparger hole in the acid and nitrogen solution spargers 18 and 19 gradually discharges a bit higher into the bed than its predecessor to wet only that material which has not reached product size. This is achieved by drilling each succeeding hole in the downstream half of each sparger in a spiral line moving from zero, at the first hole beyond the center sparger support, until the last of the holes is 90° from the zero position and thus is pointed away from the oncoming particles in the bed.

The drum is rotated at a speed rapid enough to form a rolling mass of material 34, indicated by arrows in FIG. 2, along the rising wall. A constant depth of moving material is maintained by the annular dam or weir 12. Excess material spills over the dam and is discharged from the drum. The discharge end of the drum is provided with a very small annular end portion 35 and from this end of the drum is discharged the formed spherical granules.

The rolling mass of material 34 held within the dammed-up zone will hereinafter be referred to as the "bed." The sulfuric acid, nitrogen solution, and water and/or steam are added at predetermined rates under the moving bed through the spargers 19, 18 and 17 which are arranged in the sequence shown best in FIG. 2. The moving bed of material 34 under constant flow conditions arranges itself into stratas of particles classified by size as granulation begins to occur. The larger particles work themselves to the outside layers and are discharged on arrival at the annular dam 12. The finer particles move to the inside or slower-moving zone. Intermediate sizes are graded stepwise between the two extremes. The spargers discharging through bottom holes or through holes pointing toward the wall of the granulator, wet those particles passing between the sparger and the outside wall more than any other material in the bed.

The granules that are already of sufficient size to be product are subsequently caused to enlarge in size if they are rewetted every time they pass the sparging zone. These outer layers of the bed contain a higher and higher percentage of product-size granules as the moving material approaches the discharge point. To prevent the rewetting, therefore, of product-size granules, it is important to change the manner of addition of the fluids at the midpoint of longitudinal progress through the drum granulator. Hence, as shown best in FIG. 5, each succeeding sparger hole in the acid and nitrogen solution spargers gradually discharges a bit higher into the bed than its predecessor to wet only that material which has not reached product size.

As shown best in FIG. 5, the first opening 33a near the center sparger support 16 is at point zero in the bottom of the sparger and the succeeding holes move in a spiral line laterally until the last opening 33b is 90° from the zero position of opening 33a. Opening 33b is thus pointed away from the oncoming particles in the bed and it discharges higher into the bed so as to wet only that material which has not reached product size. The addition of the steam and water mixture, which may be in the form of hot water or hot water containing steam, complements the above action by producing an overall temperature of the bed in the range of about 190–200° F.

OPERATION

In the operation of the process and apparatus, sewage sludge, process tankage, and/or cottonseed meal are fed in the proportions desired through the centrally apertured end 11 of drum 10. The drum is rotated at a speed rapid enough to form a rolling mass of material along the rising wall, as shown in FIG. 2, and the material is fed in such a manner as to maintain a constant depth of moving material within the granulating chamber 13. The steam and water mixture is fed through sparger 17. Nitrogen solution is introduced through sparger 18, and sulfuric acid is introduced through sparger 19. The temperature of the bed of material approaching the discharge is preferably kept at about 190–200° F. and the sulfuric acid and nitrogen solution are added for producing the desired granulation. As the moving bed, under constant flow conditions, arranges itself into strata of particles classified by size, the larger particles work themselves to the outside layers and spill over the circular dam, while the finer particles move to the inside or slower-moving eye portion of the mass. By employing the spiral arrangement of discharge openings 33 in the downstream portions of the acid and nitrogen solution spargers, the granules which have already reached product size are not wetted as they approach the discharge end, but instead the acid and solution are introduced higher into the bed to wet only that material which has not reached product size. By this procedure granules in the particle size of −6+16 mesh (U.S. Standard) are produced in high yield and are spherical, tough, and abrasion-resistant.

Specific examples illustrative of the process and apparatus may be set out as follows:

EXAMPLE I

Dry fertilizer raw materials, consisting of sewage sludge and cottonseed meal was fed at a constant rate to a cylindrical drum of the type shown in the drawings, which was 8 feet in diameter and 16 feet long. The drum rotated on rollers and was driven by a gear meshing with a ring gear on the drum. The drum was rotated at a speed rapid enough to keep a rolling mass of material along the rising wall, as shown in FIG. 2. The circular dam or annular weir 12 was located 10 feet from the entrance wall 11. Hot water produced by a steam-water mixture was sparged through the sparger through the sparger 17 to produce an overall temperature of the bed immediately before discharge of 190° F. Sulfuric acid and nitrogen solution were fed through spargers 19 and 18, respectively, to produce granulation of the material. As the granules were discharged through the annular dam 12, additional fertilizer mixture materials were fed into the drum so as to maintain a constant depth of the bed within the granulating chamber.

In the specific spargers used for the feeding of acid and nitrogen solution, the upstream portion of each sparger was provided with $3/32''$ holes spaced one inch apart for 24 holes, the arrangement being in a line as shown in FIG. 4, and the pipe being a 1" Schedule 40 steel pipe. In the downstream portion 18b, holes of equal size were spaced one inch apart for 25 holes in the spiral arrangement shown in FIG. 5. In the upstream portion of the steam-water sparger, the top row of holes was $3/16''$ in diameter and spaced 2" apart for 15 holes. The bottom row of holes were of the same size and spaced one inch apart for 30 holes, the pipe being a 1½" Schedule 40 pipe. The downstream portion of the sparger 17b was provided with holes of $3/16''$ size, the top row being spaced 2" apart for 11 holes and then spaced 1" apart for 10 holes. The center row was spaced 1" apart for 32 holes. The bottom row was spaced 2" apart for 11 holes.

By this procedure, relatively uniform spherical granules in the desired particle size range of −6+16 mesh were obtained. The granules resisted abrasion when subjected to packaging and handling tests.

EXAMPLE II

The process was carried out as described in Example I except that the materials fed to the drum comprised sewage sludge, process tankage and cottonseed meal and the overall temperature of the bed immediately before discharge was maintained at about 200° F. Comparable results to those described in Example I were obtained.

While in the foregoing specification process steps and apparatus parts have been described in considerable detail for the purpose of illustrating the invention, it will be understood that such details may be varied widely by those skilled in the art without departing from the spirit of our invention.

We claim:
1. In a process for preparing granular fertilizer from organic material containing substantial amounts of fibrous material and in which a bed of such material is maintained in motion within a rotating cylinder provided with an annular dam whereby the heavier particles move to the outside surface and spill over the dam and the finer particles collect on the inner side of the bed, and in which a fluid selected from the group consisting of hot water and steam is directed upon the bed, the improvement which comprises sparging sulfuric acid and nitrogen solution downwardly upon said bed material until said bed material approaches the dam and then direct- ing the sulfuric acid and nitrogen solution at a higher level upon the inner material as the material approaches the dam to avoid rewetting the outer heavier particles.

2. The process of claim 1 in which a mixture of steam and water is applied to the material to raise the temperature of the bed of material near the discharge to about 190–200° F.

3. The process of claim 1 in whch the material comprises sewage sludge, process tankage, and cottonseed meal.

4. The process of claim 1 in which the material forms a rolling bed maintained in motion along the rising wall of the drum and in which the nitrogen solution and sulfuric solution are introduced into the lower portion of the bed for the first portion of the travel of the material through the bed and said nitrogen solution and sulfuric acid are introduced at a higher level in said material as the material approaches the said dam.

5. In apparatus for preparing granular fertilizer, a cylindrical drum mounted for rotation about its longitudinal axis, said drum having a centrally apertured inlet end and having an annular dam spaced from said end to form a granulating chamber, a fixed support extending through said drum centrally thereof, a sparger support carried by said fixed support and extending toward the bottom of the drum, sparger pipes carried by the bottom portion of said sparger support, at least one of said sparger pipes having openings in its bottom adjacent said dam in a spiral arrangement extending from the bottom center to the side of the sparger.

6. The structure of claim 5 in which the spiral arrangement of openings in said sparger pipe extends through a radius of 90°.

7. The structure of claim 5 in which a larger sparger pipe for sparging hot water is provided with bottom openings lying adjacent said first-mentioned sparger pipe.

8. The structure of claim 7 in which said larger sparger pipe is connected at its central portion with a water feed pipe.

9. In apparatus for preparing granular fertilizer, a cylindrical drum mounted for rotation about its longitudinal axis, said drum having a centrally apertured inlet end and having an annular dam spaced from said end to form a granulating chamber, a fixed support extending through said drum centrally thereof, a scraper carried by said support and extending upwardly along the adjacent wall of the granulating chamber, a sparger support carried by said fixed support and extending toward the bottom of the drum, a water sparger pipe carried by said sparger support, and inwardly thereof an acid sparger pipe and a nitrogen solution pipe carried by said sparger support, discharge holes in the bottom of each of said sparger pipes, the holes in the portion of the acid and solution pipes adjacent said dam being spirally arranged and extending from a zero position in the center of the bottom of the pipe to a side wall position about 90° from said first-mentioned hole.

References Cited

UNITED STATES PATENTS 3,022,142    2/1962    Sackett _____ 23—259.1
3,050,383    8/1962    Wilson.

DONALL H. SYLVESTER, *Primary Examiner.*

R. D. BAJEFSKY, *Assistant Examiner.*

U.S. Cl. X.R.

23—259.1, 313; 71—23, 64